United States Patent Office 2,730,448
Patented Jan. 10, 1956

2,730,448

METHOD OF PREPARING IMITATION MEAT PRODUCTS (pH CONTROL)

Robert A. Boyer, Cincinnati, Ohio, and Harold E. Saewert, Park Forest, Ill., assignors to Swift & Company, Chicago, Ill., a corporation of Illinois No Drawing. Application February 2, 1953,
Serial No. 334,757

3 Claims. (Cl. 99—14)

The present invention relates in general to the treatment of edible protein material preparatory to forming the same into food products. This invention represents an improvement over the method disclosed and claimed in the earlier-filed application of Robert A. Boyer, Serial No. 118,445, entitled "Synthetic Meat," filed September 28, 1949, and now abandoned, and in the continuation-in-part thereof, Serial No. 286,447, filed May 6, 1952, now Patent No. 2,682,466.

Many efforts have heretofore been made to develop a satisfactory meat substitute which would possess the required amount of protein and which would simulate meat as to the texture, flavor, and appearance thereof. As disclosed in the aforementioned, earlier-filed application, a completely satisfactory meat substitute may be prepared from edible protein material such as soybeans, corn or peanut proteins, as well as from animal proteins such as casein. These protein materials are produced in the form of fibers or filaments which are coagulated in a suitable bath and stretched by means of a take away reel. The filaments are then placed in a salt solution (such as sodium chloride) of sufficient concentration to prevent the filaments from redissolving. Groups of these filaments, in accordance with the method disclosed in said earlier-filed application, are formed into bundles or tows and then freed from excess liquid by squeezing or centrifuging. The bundles of filaments are then mixed with a suitable binder which may be an agent or medium for holding the filaments in place in relation to each other such as cereals, edible proteins, dextrins, gums, starches, etc. The individual groups of filaments may then be assembled into a tow and passed through a bath of melted fat or the like, or alternatively the individual groups of filaments may be first treated with fat and thereafter assembled into a tow. Different characteristics may be imparted to the final product by varying the steps leading up to the end product. For example, varying the pressure in assembling the final tow will vary the density and texture of the final product. Likewise, varying the method of coating the protein filaments will produce different effects. The toughness or tenderness of the resulting product can be controlled to some extent by the amount of orientation which is imparted to the filament in the extrusion or initial forming procedure. Also stretching by means of a take away reel results in an orientation of the molecules in the protein fibers and will depend on the speed at which the filaments are led away from the spinneret or die. The actual formation of the synthetic meat product is not considered to be a part of the present invention and has been described supra solely as an aid in understanding the problems met by the present invention.

In the production of synthetic meat as discussed above or in the production of other food products in a similar manner, one of the most important characteristics which must be controlled is the degree of toughness or chewiness of the resulting product. As indicated above, a certain amount of control over this characteristic may be exercised by the stretching operation. However, it has been found impossible to produce the uniformity necessary solely by the stretching step.

It is, therefore, an object of the present invention to provide a method for controlling and adjusting the degree of toughness of edible protein fibers.

It is an additional object of the present invention to provide a method for controlling the toughness of individual fibers of edible protein material prior to their incorporation into a food product.

Additional objects, if not specifically set forth herein, will be readily apparent to one skilled in the art from the following detailed description of the invention.

Generally, the present invention comprises adjusting the pH of edible protein fibers to within a specific range whereby a texture or degree of toughness requisite for the use of such fibers in a food product is achieved.

More specifically, the present invention comprises the subjection of edible protein fibers, such as casein or soybean protein fibers, to the action of an alkaline media for a sufficient period of time to increase the pH of said fibers to within the range 4.0–7.0. The following brief description of the formation of edible protein fibers from the original dispersion is given for the purpose of illustration only.

The protein fibers or filaments are preferably produced by dispersing the proteins which are the starting material in a suitable dispersing medium such as an alkaline aqueous solution. Actually, depending upon the material dispersed and the dispersing agent used, the dispersion may amount to a colloidal solution, and it will be understood that the use of either term in the claims is inclusive of the other. This dispersion is then forced through a porous membrane, such as a spinneret used in the production of rayon, into a coagulating bath which is generally an acid salt solution. The streamlets coming through the spinneret are thus precipitated into the form of filaments. The filaments issuing from the spinneret, which actually is a small die having from perhaps five thousand to fifteen thousand holes each on the order of 0.003 inch in diameter, will be of a diameter of about 0.003 inch. When these latter filaments are stretched, they are elongated and reduced in diameter until the average thickness is on the order of 20 microns.

Following the formation of the protein material into fibers, the fibers are subjected to a stretching operation as hereinbefore described. The fibers leaving this stretching operation will have a pH in the neighborhood of about 3.0. Such a pH has proven undesirable for the subsequent use of such fibers in a food product or the like both from a taste standpoint and also because of the toughness of such fibers. It has been found that not only can the taste of such fibers or filaments be improved by altering the pH, but also that the degree of toughness of the fibers is a function of the pH. According to the method of the present invention, the fiber tow or bundle of filaments, following the stretching operation, is fluffed out to prevent matting and sticking together of the filaments during the treatment of the present invention. The fibers emerging from the stretching operation are generally adhered very closely together and, in order to achieve satisfactory treatment of the individual filaments, this fluffing step is desirable. It may be accomplished in any desired manner, as by passing the stretched tow through a series of squeeze rolls or the like.

In adjusting the degree of toughness of the fibers, the tow is immersed in a salt solution of approximately ½ to 12 percent concentration. The solution is continuously adjusted to a pH within the range 4.0–7.0 by the addition thereto of an alkaline solution prepared from any alkali or buffering agent which can be considered suitable for use in food products in order to compensate for the decrease in pH of the salt solution due to the acidity of the fiber. It is preferred to utilize a 3.5 per cent NaOH solution for this purpose. The tow must be slowly agitated within the neutralizing bath in order to permit good penetration of the individual fibers. The neutralizing bath should be maintained at a temperature between 85° and 100° F. for most efficient operation in eliminating brittle and broken filaments. At lower temperatures the fibers tend to be very brittle and to break upon agitation. The following specific examples are furnished for the purpose of illustration only and are not to be construed as placing any limitations on the scope of the present invention.

*Example I*

A tow of casein fibers, prepared as described above and equivalent to 5 pounds of wrung fiber, was slowly agitated within a neutralizing bath containing about 280 pounds of 12 per cent salt water, said bath being maintained at a temperature of about 90° F. The pH of the neutralizing bath was maintained at about 6.0 by the addition of 3.5 per cent NaOH solution into the bottom of the tank containing such solution. The pH of the fibers was increased from its initial value of 3.0 to pH of 5.5. This increase required the addition of 150.0 ml. of 3.5 per cent NaOH solution over a period of one-half to one hour's time. The resulting fibers were found to possess a texture and degree of toughness very closely approximating the "chewiness" of natural meat fibers.

*Example II*

A tow of soybean fibers, prepared as described above, was slowly agitated within a neutralizing bath of tap water. The bath was adjusted to a pH of 6.8 by the addition of acetic acid. As agitation continued, the pH of the soybean fibers gradually increased from 3.0 to about 6.2. The original tow, prior to treatment, consisted of very tough and undesirable fibers. After treatment and pH adjustment, the fibers comprising the tow had approximately the same toughness as natural meat fibers, and when chewed possessed a very close resemblance to the natural meat texture.

The method of the present invention is applicable to all native protein material which is edible in its original form. In addition to the casein and soybean material illustrated above, peanut and corn gluten, pea protein, wheat protein, and oat protein materials may be used.

While the main result of the present invention is the control of the degree of toughness of the resulting edible protein fibers, secondary results of considerable value to the final product are also achieved by the pH adjustment. Through control of the pH of the fibers, it is possible to eliminate the sour taste of the fibers without requiring a washing operation. Additionally, it has been found that the pH of the fibers has a substantial effect on the water-holding capacity of the fibers. Consequently, the present invention also permits an adjustment of the moisture content of the product through pH control as shown by the following example.

*Example III*

One lot of casein fiber, prepared as for Example I, was treated in the manner of Example I, the pH of the fibers being adjusted to a value of 4.5. A ham-like product was prepared from these fibers in the manner disclosed and claimed in Serial No. 118,445 and briefly described above. The product had a final pH of 5.1 and a total weight of 169 grams.

An identical amount of the same casein fiber, formed into a ham-like product in the same manner as the first, using the same amounts of materials, i. e., binders, flavoring, etc., but having had its pH adjusted to a value of 5.3 rather than the pH 4.5 of the first lot, produced 230 grams of product having a final pH of 5.6.

As may be seen from Example III, variations in the pH control of the fibers permit a variation in the moisture content of the final product, the higher pH values permitting the fiber to hold substantially more moisture, e. g., 61 grams which is largely moisture for a variation of only 0.8 in pH as illustrated in Example III.

At a pH below the lower limit of 4.0, protein fibers are too dry and tough and possess too sour a taste to be of value in the preparation of synthetic food products. The upper pH limit of 7.0 defines the point at which the fibers became too soft and tender to be of value in the formulation of a food product and, as is the case with casein fibers, may actually dissolve. Accordingly, it is essential that the pH of the protein fibers be maintained within the specified limits.

Obviously, many modifications and variations of the invention as hereinbefore set forth may be made without departing from the spirit and scope thereof, and therefore only such limitations should be imposed as are indicated in the appended claims.

We claim:

1. In the preparation of food products from edible protein material wherein the protein material is formed into filaments during the preparation, the improvement which comprises: subjecting the edible protein filaments to the action of a neutralizing media; and adjusting the pH thereby to within the range of pH 4.0 to 7.0 whereby to improve the texture and water-holding ability of said filaments.

2. In the preparation of food products from edible protein material wherein the protein material is formed into filaments by precipitation in an acid media, the improvement which comprises: treating the edible protein filaments, having a pH of about 3.0 as a result of the acid precipitation, to the action of a buffering agent; and raising the pH thereby to within the range 4.0 to 7.0 whereby to improve the texture and water-holding ability of said filaments.

3. The method of treating edible protein fibers to produce fibers having the same degree of toughness as the fibers naturally occurring in meat which comprises: forming a dispersion of edible protein material; forming filaments from said dispersion by precipitation in an acid media; subjecting the resulting filaments to the action of a neutralizing bath; and maintaining said filaments within said bath until the pH is within the range 4.0 to 7.0 whereby to improve the texture and water-holding ability of said filaments.

References Cited in the file of this patent

UNITED STATES PATENTS

| Number | Name | Date |
|---|---|---|
| 1,001,150 | Kellogg | Aug. 22, 1911 |
| 2,162,047 | Allen | June 13, 1939 |
| 2,211,961 | Meigs | Aug. 20, 1940 |
| 2,376,485 | Hermann et al. | May 22, 1945 |
| 2,398,636 | Henney et al. | Apr. 16, 1946 |
| 2,414,299 | Hall | Jan. 14, 1947 |

OTHER REFERENCES

"The Meat Flavour," by Max Salomon, Food Manufacture, March 1943, pages 91 and 92.